United States Patent Office 3,687,767
Patented Aug. 29, 1972

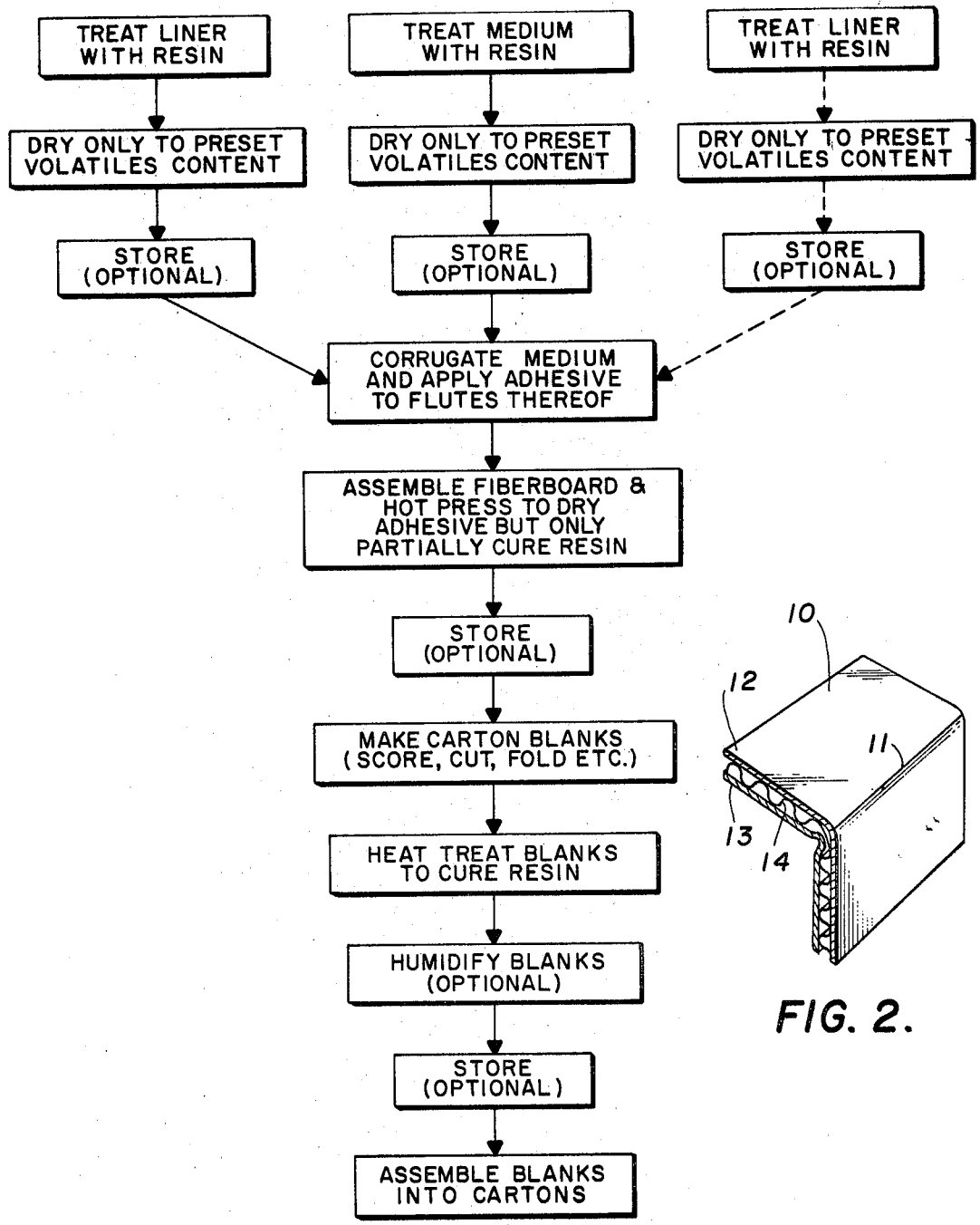
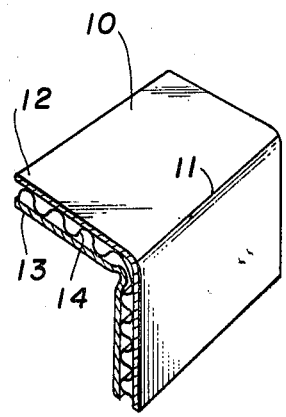
FIG. 2.
FIG. 1.

3,687,767
SCORING PROCESS FOR CERTAIN RIGID-WHEN-WET CORRUGATED FIBERBOARD
Abraham J. Reisman, Springfield, Mass., and Thomas B. Wilkinson III, Houston, Tex., assignors to Alton Box Board Company, Alton, Ill., and Monsanto Company, St. Louis, Mo.
Continuation-in-part of abandoned application Ser. No. 647,624, June 21, 1967. This application Feb. 25, 1971, Ser. No. 119,010
Int. Cl. B31f 1/20
U.S. Cl. 156—210  9 Claims

ABSTRACT OF THE DISCLOSURE

A process for maximizing crack resistance in score lines of rigid-when-wet corrugated fiberboard made using medium and/or liner members pretreated with a resole phenolic resin system which has been modified with urea and inorganic ammonium salt and which preferably contains an organo silyl compound. The process involves forming the corrugated fiberboard using such resin pretreated members under certain controlled temperature conditions, scoring the so-produced corrugated fiberboard, and then heating the so-scored corrugated fiberboard to thermoset the pretreating resin system.

RELATED APPLICATION

This application is a continuation-in-part of our earlier filed U.S. application, Ser. No. 647,624, filed June 21, 1967, now abandoned.

BACKGROUND

Corrugated fiberboard construction, especially carton blanks and cartons assembled therefrom, have been known to suffer from deficiencies in moisture and crush resistance, which makes such fiberboard constructions unsuitable for many applications. Although certain thermosetting resins, such as phenol-formaldehyde resins, have heretofore been proposed for use in treating corrugated fiberboard in order to impart improved rigid-when-wet properties (water resistance, strength) thereto, it has been observed that such treatment as heretofore practiced generally involves board embrittlement with a corresponding loss of strength and flexibility so that the product resin treated corrugated fiberboard tends to crack, especially at score lines, thereby promoting ultimate fracture or tearing of cartons formed therefrom particularly under the stress conditions where carton strength is most needed.

It has now been discovered that, by using a certain modified phenol-aldehyde resin system, preferably in combination with an organo silyl material, for pretreatment of medium and/or liner members used in a corrugated fiberboard, and, further, by crosslinking (thermosetting) the corrugated fiberboard made therewith only after such corrugated fiberboard has been scored, there is provided a process which enables one to make a rigid-when-wet corrugated fiberboard construction which appears to have not only such prerequisites for such fiberboard constructions as high wet strength, but also surprising crack resistance in score lines. The process can be practiced at the usual high speeds employed in conventional, contemporary corrugated fiberboard and carton blank manufacturing equipment, a feature not heretofore believed possible using, for example, unmodified phenol-aldehyde treating resins.

SUMMARY

The present invention relates to a process for making improved rigid-when-wet corrugated fiberboard constructions having improved crack resistance. More particularly, this invention is directed to a process for maximizing crack resistance in score lines of corrugated fiberboard having high wet strength (e.g. rigid-when-wet corrugated fiberboard). The process employs resin pretreated medium and/or liner members which are formed into a corrugated fiberboard under certain controlled temperature conditions. The resulting corrugated fiberboard is then scored as desired, and then the so-scored corrugated fiberboard is heated to temperatures sufficient to substantially completely thermoset the resin used for pretreatment.

Crack resistance is determined by folding a scored corrugated fiberboard produced in accordance with the present invention along (or at) a score line, folding being accomplished by moving the fiberboard portions adjacent each side of the score line through 90°. relative to each other with the score line as axis and with a liner on the outside of the fold. If the outside liner member splits or cracks in or about the score line, the fiberboard has failed and thus has poor crack resistance.

For purposes of the present invention, wet strength of corrugated fiberboard is conveniently measured comparatively using flat crush resistance data before and after moisture exposure by means of ASTM Test Procedure No. D–1225–54.

A paper sheet member adapted for use as a medium in the paperboard ranging in thickness from about 7 to 15 thousandths of an inch and having a grade weight of from about 25 to 36 pounds per 1000 sq. ft.

A paper sheet member adapted for use as a liner in the manufacture of corrugated fiberboard by the present invention utilizes a paperboard ranging in thickness from about 5–20 thousandths of an inch and having a grade weight of from about 33 to 120 pounds per 1000 sq. ft.

Either the paper medium member(s), or the paper liner member(s), or both, used in corrugated fiberboard construction have each been treated with from about 5 to 20 weight percent total (dry weight basis) with a modified phenol-aldehyde resin system. Said so-treated paper is thereafter processed (as in a conventional air-drying operation) so as to have a total volatiles content of from about 5 to 10 weight percent. The terms "treated," "treating," "treatment," or equivalent word form as used herein are generic to both impregnation and coating of such substrate paper itself. Treatment can be accomplished in any convenient, conventional manner, as hereinafter further detailed and illustrated. Preferably, in any given corrugated fiberboard construction made by the present invention, a medium member is always so treated with such modified phenol-aldehyde resin system, while the liner member need not be so treated (but preferably is).

A corrugated fiberboard construction made by this invention thus employs at least one medium, as above described, and at least one liner, as above described. Each such medium is corrugated and positioned adjacent each such liner on one side thereof (preferably a construction has a liner in each side of a corrugated medium). Each liner is bonded to its adjoining medium at positions of mutual contact therebetween with an adhesive which is interposed therebetween at such positions of mutual contact (typically, the tips of the corrugated medium flutes).

The adhesive used may be any binder composition for paper which is initially in a fluid condition and which, when in the form of a film of about 15 mils thickness, is adapted to dry to a substantially water insoluble state following application thereto of heat in the amount from about 225 to 350° F. applied inversely for times of from about 5 to 0.5 second. Examples of adhesives commonly employed include, especially resorcinol-starch-formaldehyde, polyvinyl alcohol, urea-starch-formaldehyde, and phenol-starch-formaldehyde adhesives. Water - insoluble adhesives are those which maintain integrity of the medium to liner bond even after a 24 hour soak in water at 25° C. A water resistant adhesive will still maintain some strength, e.g. when tested for "pin" adhesion according to TAPPI Test RC–269. Typical values are at least 15 lbs./4 inches square after 24 hour water soak.

DRAWINGS

The present invention is better understood by reference to the attached drawings wherein:

FIG. 1 is a flow sheet illustrating one manufacturing process for making box blanks in accordance with the teachings of this invention; and FIG. 2 is a diagrammatic perspective view of a sample of a scored, thermoset corrugated fiberboard produced in accordance with the teachings of the present invention.

Turning to FIG. 1, there is seen in block form a flow sheet for a carton blank manufacturing procedure which incorporates the teachings of this invention. Since this flow sheet is believed to be largely self-explanatory, particularly in view of the present specification, no detailed description thereof is given here.

In FIG. 2, there is seen a corrugated fiberboard construction produced by the process of the present invention which construction is herein designated in its entirety by the numeral 10. Construction 10 incorporates a pair of liner members 12 and 13 having interposed therebetween a corrugated medium member 14, member 14 being bonded to members 12 and 13 by adhesive (not shown) applied to flute tips of medium member 14. Medium member 14, liner member 12, and/or liner members 13 are treated with a modified phenolic resin, preferably including an organo silyl compound, as taught herein.

After a starting corrugated boxboard has been scored and heat treated as taught by the present invention, and then is bent along the score line 11 into a configuration like that shown in FIG. 2, little or no cracking is evident in score line 11.

DETAILED DESCRIPTION

As those skilled in the art will appreciate, in the art of corrugated fiberboard, it has been conventional to employ as the medium sheet member either kraft paper or jute paper. A corrugated medium member is formed by running a continuous sheet of medium through corrugating rolls. The medium, or "9 point" as it is sometimes called, takes on a wave-like shape as it passes between the corrugating rolls which mesh similar to gear teeth except that they are especially shaped to provide contours deemed best by a particular manufacturer for corrugations.

While the corrugating medium may be any of the cellulosic fibrous sheet materials conventionally used in the art, it is usually a sheet of about 26 pounds per 1000 sq. ft. having a thickness of about 0.009 inch for all grades of combined board, but for purposes of the present invention, may be heavier or lighter for special requirements. Corrugating medium, for example, is most commonly made from "semi-chemical" pulp but is also made from straw, kraft, bogus, or chip (mixed, repulped fibers).

There are four conventional or standard sizes of corrugations as follows:

TABLE I

| Designation | Number of flutes per foot (approximate) | Thickness of single wall board, in.[1] |
|---|---|---|
| A | 33–39 | 0.185–0.210 |
| B | 47–53 | 0.97–0.105 |
| C | 39–45 | 0.139–0.145 |
| D | 90–97 | 0.045–0.0624 |

[1] Approximate, depending on thickness of facings and also the particular corrugating rolls.

As with medium sheet members, any conventional liner sheet member can be used in the manufacture of the corrugated fiberboard of the present invention. Generally, the liner sheet members are made from sulfate kraft, but sometimes are made from other pulps.

Kraft for liner sheet members is usually made on a Fourdrinier machine although some is made on a cylinder machine. Commonly, liner sheet members are made to standard weights which are 26, 33, 38, 42, 47, 62, 69, and 90 pounds per 1000 sq. ft. with thicknesses for liner sheet members ranging from 0.009" to 0.025".

Details on the characteristics of medium sheet members and liner sheet members are well known to the corrugated fiberboard manufacturing industry. See, for example, Uniform Freight Classification Rule 41. The corrugation flutes can be combined using adhesive with a facing or liner sheet member on one side only, called a single face board; when facings are on both sides of the corrugated medium sheet member, the product is sometimes called single wall board or double face board. If there are two sheets of flutes with a facing on each side and one in the middle, the product is sometimes called double wall board. If there are three layers of flutes with two outer liner facings and two inner liner facings between media layers, the product is sometimes called triple wall board.

The modified phenol-aldehyde resin system used comprises:

(A) From about 80 to 94 weight percent (based on total modified phenol-aldehyde resin system dry weight basis) of a phenolformaldehyde resol resin, (B) From about 1 to 5 weight percent (same basis) of at least one inorganic ammonium salt having a pH of from about 0.8 to 6.5 when in a 5 weight percent aqueous solution, such as, for example, ammonium chloride (preferred), and other ammonium halides, ammonium sulfate, ammonium phosphate (including acid salts thereof, ammonium nitrate, and the like, (C) The remainder up to 100 weight percent (same basis) of any given such system of urea. This resin system has a pH in the range of from about 0.8 to 6 (preferably about 1 to 4) when in the form of an aqueous solution of about 35 weight percent total resin system solids.

The phenol-formaldehyde resole resin used in this resin system is, itself, characterized by having:

(A) A water solubility such that about a 55 weight percent aqueous solution of resole resin solids can be prepared, (B) A combined average number of mols of formaldehyde per phenol ring of from about 1.0 to 2.9 (preferably from about 1.4 to 2.5), (C) A pH of from about 7 to 9.2 when in the form of an aqueous solution of about 35 weight percent total resin solids, and (D) An ash content of less than about 2.5 weight percent (based on about a 35 weight percent solution of total resin solids).

The adhesive used most preferably comprises a resorcinol-starch-formaldehyde adhesive system which is characterized by:

(A) Having a total resorcinol to total starch weight ratio (based on total adhesive system solids) of from about 1 to 7, (B) Containing at least about 1 weight percent (based on total adhesive system solids) of combined formaldehyde, and (C) Containing at least about 70 weight percent of starch (based on total adhesive systems solids).

The modified phenol-aldehyde resin system can be made by any conventional procedure known to the art of phenolic resins. For example, one convenient and preferred procedure involves condensing usually at temperatures ranging from about 50 to 80° centigrade phenol and formaldehyde in the above-indicated desired mol ratio under aqueous liquid phase conditions in the presence of a basic catalyst, such as an alkali metal hydroxide (e.g. sodium hydroxide), or an alkaline earth hydroxide (e.g. calcium hydroxide), a trialkyl amine (e.g. triethylamine) or the like, until a desired end point is reached, such as, for example, a free formaldehyde content which is preferably less than about 3 to 10 weight percent.

The product is a phenol-formaldehyde resole resin in aqueous solution having a total solids content of from about 30 to 70 weight percent. Usually and preferably, the resin solution is prepared as a concentrate of from about 40 to 55 weight percent solids (based on the total solution weight) which may be conveniently and preferably diluted down before use to a solids content of from about 5–50 weight percent. Preferably, the solids content of the concentrate ranges from about 45–60 weight percent and preferably the solids content of the diluted working solution ranges from about 15–45 weight percent solids content of the diluted working solution ranges from about 15–45 weight percent.

For use in the products of this invention, it has been found that this resole resin should preferably not be advanced in manufacture beyond the point where it has a water solubility such that about a 55 weight percent solids in aqueous solution thereof can be prepared (preferably about 30 weight percent). Also, it has been found that this resole resin should preferably have a methylol content per aromatic ring of from about 0.5 to 3 (preferably from about 1 to 2.5) as determined, for example, by NMR measurements.

If such resin is more advanced (i.e. has a high molecular weight) than such a solubility as above indicated, or if such resin has a different methylol content than that above indicated, then it appears to have less desirable paper treating characteristics, especially at the high application speeds conventionally employed for paper transport in the manufacture of corrugated fiberboard, for purposes of practicing the present invention.

In addition, it has been found that this resole resin before addition of urea and inorganic ammonium salt thereto should preferably have a pH of from about 5.6 to 9.2 when in the form of an aqueous solution of about 35 weight percent total resin solids (preferably from about 7 to 8.5). Also, it has been found that this resole resin should preferably have an ash content of less than about 2.5 weight percent based on about a 35 weight percent aqueous solution of total resin solids (preferably less than about 0.7).

One convenient way in which to measure the ash content for present purposes is to take two grams of such an aqueous solution (35 percent solids) and deposit same in a crucible. The crucible is then heated to about 150° C. for about 2 hours to substantially completely crosslink the resin and evaporate free water and thereafter the crucible is exposed to about 1000° F. for about 24 hours. Afterwards, the crucible is cooled to room temperature and measured to determine an increase in weight over starting empty weight thereby giving the ash content of the resin.

If such resin has a lower or higher pH, or a higher solids content, than those respectively above indicated, then it appears to have undesirable effects upon product paper treated therewith, especially in the properties of corrugated fiberboard made therefrom, for purposes of making the improved products of this invention.

In making the modified phenol-aldehyde resin systems for use in this invention, it is generally convenient and preferred to add both the ammonium salt and the urea in the respective amounts above indicated, each in the form of a finely divided powder, or even (preferably) already dissolved in water, to the diluted or partially diluted phenol-formaldehyde resole resin (just described). Such addition typically causes this pH of this product system to fall in the range from 0.8 to 6, as above described.

Sometimes, in order to make the pH of the product phenol-aldehyde resin system low, yet within the indicated range, one may, if desired, add to a given resole resin solution, preferably one diluted for use and having the ammonium salt and urea already dissolved therewith, amounts of a strong inorganic acid, such as hydrochloric, or the like, until the pH is lowered to some desired value in the range indicated; however, such an acid addition is generally not necessary owing to the presence of the ammonium salt which, itself, tends to produce a pH within the ranges indicated.

The ammonium salt and the urea are conveniently not added to a resole resin solution until shortly before a medium or liner sheet member is to be treated with a resin system. The organo silyl compound is usually and preferably added to the resin solution shortly before a medium or liner sheet member is to be treated with the combined resole resin and organo silyl compound. The organo silyl compound is preferably added as a solution in an organic solvent. Any common organic solvent may be used such as acetone, methanol, ethanol, etc. Alternatively, the organo silyl compound can be added as an emulsion or suspension or even in the form of a finely divided solid. At the time of paper treatment, it is preferred to have the organo silyl compound dispersed in the resin system in the form of colloidal size particles.

In general, an organo silyl compound employed in the practice of this invention can be any compound which:

(1) contains at least one silicon atom per molecule,
(2) has a molecular weight in the range from about 60 to 600,
(3) is water dispersible (that is, is dissolvable or suspendable as colloidal sized particles in water),
(4) is polymerizable with itself,
(5) thermosets when heated to temperatures ranging from about 250 to 450° F. to such an extent that the resulting cured (thermoset) polymer gives less than 2 weight percent total extractables with acetone.

Preferred such organo silyl compounds can be classified as organo silanes and organo siloxanes. Thus, one preferred class of organo silanes is characterized by the formula:

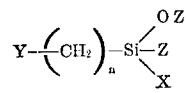

where

Y is a terminal group containing at least one functional group,
X is methyl, ethyl, methoxy, ethoxy,
Z is methyl, ethyl, propyl,
n is an integer of from 1 through 5.

One preferred class of organo silanes is functionally substituted-propyl triethoxy silane wherein the functional substituent is either a primary amine group ($-NH_2$) or an epoxy group

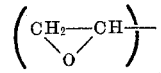

Specific examples includes dimethyl polysiloxane, available commercially under the designation SM–2013 from the General Electric Company; n-(trimethoxy silyl propyl)ethylene diamine, available commercially under the designation Z–6020 from Dow Corning Corporation; γ-glycidoxypropyl trimethoxy silane, available commercially under the designation Z–6040 from Dow Corning Corporation; n-(dimethoxy methyl silyl isobutyl) ethylene diamine, available commercially under the designation XZ–Z–2023 from Dow Corning Corporation; γ-aminopropyl triethoxy silane, available commercially under the designation A–1100 from Union Carbide Corporation, and the like.

The medium and liner can be treated with a resin system with or without a silyl compound by immersion or any other convenient coating techniques, as indicated above. For example, in liner treatment, a preferred method involves surface coating rather than immersion impregnation. Suitable coating procedures involve resin application to one surface of a liner sheet, as with a brush, doctor blade, or other application mechanism. Such a procedure is particularly applicable when only one side of a liner is to be treated with a resin system because a coating procedure produces a differential impregnation or coating of the liner. Thus, the resin density is then greater relative to one surface of the resulting liner sheet than relative to the other (opposed) surface thereof. In general, it is preferred to uniformly coat both liner and medium sheet members with a resin system.

After treatment, a medium or liner sheet member is dried by passing such over or through a hot zone so that excess moisture is removed and the total volatiles content of the so-dried sheet ranges from about 5 to 10 weight percent. Drying temperature should not exceed about 225° F. for more than 0.1 second so as to avoid any significant curing (thermosetting) of the treating resin system. Typical drying conditions usually involve temperatures of from about 170 to 225° F. applied, inversely, for times of from about 0.5 to 15 minutes though longer or shorter times and temperatures can be employed without departing from the teachings of this invention. Those skilled in the art will appreciate that, in drying, the resin is B-staged and free water is substantially completely removed without appreciable advancement or curing of the resin impregnated into the liner or medium sheet member. Thus, the percentage of volatiles in a treated liner or medium is controlled within the ranges above indicated. For example, if the percentage of volatiles is reduced below such range, the resin system tends to crosslink and subsequently during corrugated fiberboard production reduced adhesive bonding to such a resin crosslinked medium or liner sheet tends to result, among other undesired results. On the other hand, for example, if the percentage of volatiles is left appreciably above, such range, reduced adhesive bonding can likewise result. Also, outside of these ranges, a treated medium may be difficult to corrugate.

Next, if not stored interveningly, a so-treated medium and liner member are combined with adhesive and, if used, untreated medium and/or liner members into corrugated fiberboard. Commercially, a conventional combining machine may be used for this operation.

The adhesive used in the combining operation is as characterized above. Typically, as in a plant manufacturing operation, an adhesive used to make a starting corrugated fiberboard used in this invention, at the time of its application to a medium is in the form of an aqueous system whose viscosity ranges from about 200 to 8000 cps. (preferably 300 to 5000) and which has a total solids content of from about 15 to 30 weight percent. Usually, the adhesive system is in the form of a uniform heterogeneous aqueous dispersion. If present in the system, starch is partially dissolved and partially dispersed.

Such adhesive systems are conventional to the art and do not constitute a part of the present invention. In general, the adhesive used is prepared just prior to the time of use by a fiberboard manufacturer or it is prepared by a supplier to him. Commonly, a supplier provides the adhesive as a one tank or two tank formulation, which is combined in the case of two tanks, and which is typically further diluted with water before actual application. Although an adhesive is generally discontinuously but automatically applied only to the flutes of a corrugated treated medium when using machinery to make corrugated fiberboard of this invention, typical machine adhesive application rates range from about 3 to 12 pounds adhesive solids per 1000 sq. ft. of product corrugated fiberboard but more or less than this amount can be employed. Adhesive application rates are not critical and can be widely varied without departing from the spirit and scope of this invention.

In a combining operation in accordance with the teachings of the present invention, the adhesive is interposed between liner member and corrugated medium member at positions where flute tips of the corrugated medium member contact the liner member. The entire bonding operation is usually conducted at temperatures of from about 225 to 350° F. within times of from about 0.5 to 5 seconds. Such preferred heating temperatures and times substantially completely dry the adhesive, but do not thermoset the resin, thus bonding together the medium and liner sheet members at positions of mutual contact therebetween, thereby to form a desired corrugated fiberboard.

Usually, and conventionally, a starting corrugated fiberboard is directly converted into box blanks, it is conventional to place at the end of a combining machine knives which cut the corrugated fiberboard into the lengths required by the particular box to be made. Next, the resulting piece of board is scored longitudinally, so as to permit folding such board to make the top and bottom flaps of a box. In this operation, the sheet of fiberboard product is also longitudinally edge trimmed to an exact predetermined width. In some modern machines, during the operation of scoring longitudinally, the longitudinal edge trimming is performed before the corrugated fiberboard continuous sheet is cut to length for individual box blanks. The next carton blank manufacturing operation usually accomplishes three functions: The sheet is trimmed transversely to a desired length, three slots with connecting score lines are cut on both sides of the sheet to form the individual top and bottom flaps, and any desired printing is applied to the surface (usually exteriorly). Finally, in a fourth manufacturing operation, the product box blank is folded so that the two ends come together and are then joined by taping, gluing, or stapling. This flattened "tube" can then be opened up into box form, the bottom flaps folded closed and sealed, the contents placed inside, and the top flaps folded and sealed.

Those skilled in the art will appreciate that a starting corrugated fiberboard may be subjected to a plurality of operations in which scoring constitutes only one operation before the final heating step.

Following a scoring operation, when practicing the present invention, the resulting scored corrugated fiberboard is subjected to temperatures of from about 320° F. to 450° F. for, inversely, times of from about 0.5 second to 10 minutes whereby the modified phenol-aldehyde resin system (and the silyl material, if present) is completely thermoset. For example, a corrugtaed fiberboard prepared by scoring, cutting, slotting, etc. is subjected to a final blank heat processing step using conditions as just described.

Those skilled in the art will appreciate that the scored corrugated fiberboard, independently of any other processing steps which may be performed upon or with the scored fiberboard, is subjected to the thermosetting heat described above in order to complete the process of this invention.

The product fiberboard displays improved properties as described above.

EMBODIMENTS

The following examples are set forth to illustrate more clearly the principles and practice of this invention to one skilled in the art and they are not intended to be restrictive but merely to be illustrative of the invention herein contained. All parts are parts by weight unless otherwise indicated.

The following examples illustrate resin systems and adhesives suitable for use in making products of this invention.

Example A

A phenol-formaldehyde resole resin herein designated Resin A is prepared as follows:

To 100 parts of phenol in a reaction kettle are added first 180 parts of 50 percent formalin and then 4 parts of sodium hydroxide sufficient to bring the pH to about 8.6. The mixture is refluxed for about 3 hours at about 65° C., while maintaining a reaction pH of about 8.6. Thereafter, this mixture is cooled to about 40° C. This mixture is then neutralized to a pH of about 7.0 with aqueous diluted hydrochloric acid. The resulting mixture is dehydrated under vacuum to the desired solids level (see Table A below). The product yield is about 270 weight percent based on starting phenol. The product has a water solubility such that a 55 weight percent aqueous solution of resole resin solids can be prepared. The resin characteristics are summarized in Table A below.

The characteristics of the Resin A so prepared as well as the characteristics of two other resole resins herein designated B and C, respectively, both somewhat similarly prepared, are given in Table A below:

TABLE A

| Resin characteristic | A | B | C |
|---|---|---|---|
| Total resin solids in aqueous solution | 55 | 50 | 48 |
| Free formaldehyde [1] | 9 | 6 | 8.5 |
| pH [2] | 7 | 7.2 | 8.0 |
| Combined average moles formaldehyde per aromatic ring [3] | 2.25 | 2.25 | 2.15 |
| Ash content [4] | 2.3 | 0.3 | 0 |

[1] Free formaldehyde content determined by the so-called hydroxylamine hydrochloride method.
[2] pH measured at 25° C. using an aqueous solution of about 35 weight percent total resin solids.
[3] Measured by methylol content and methylene bridges per aromatic ring using nuclear magnetic resonance on a sample of product.
[4] Ash content determined using a 35 weight percent aqueous solution of total resins at 170° F. at 2 hours and thereafter pyrolyzed for 24 hours at 1000° C.

A modifier solution herein designated modifier D is prepared by dissolving 30 parts by weight of urea and 10 parts of ammonium chloride in 60 parts of water.

Another modifier solution herein designated modifier E is prepared by dissolving 400 parts by weight of urea and 150 parts by weight of ammonium chloride in 600 parts of water.

Still another modifier solution herein designated modifier F is prepared by dissolving 50 parts by weight urea and 30 parts by weight ammonium sulfate in 200 parts water.

A phenol-aldehyde resin system paper treating solution is made by diluting 50 parts of the resin of Resin A with 25 parts of water and then adding thereto 8 parts of the modifier solution of modifier D. The product resin system comprises (on a 100 dry weight percent basis) about 84 weight percent phenol-formaldehyde resole resin; about 4 weight percent ammonium salt, and about 12 weight percent urea. The system has a pH of about 1.5 when in the form of an aqueous solution of about 35 weight percent total resin system solids. As thus made, this resin system, herein designated system G, contains about 30 weight percent total resin system solids with the balance up to 100 weight percent being water.

Another phenol-aldehyde resin system treating solution is made by diluting 100 parts of the resin of Resin B with 100 parts of water and adding thereto 12 parts of the modifier solution of modifier E. The product resin system comprises (on a 100 dry weight percent basis) about 20 weight percent phenol-formaldehyde resole resin; about 1.5 weight percent ammonium salt, and about 3.5 weight percent urea. The system has a pH of about 2.0 when in the form of an aqueous solution of about 35 weight percent total resin system solids. As thus made, this resin system, herein designated system G, contains about 25 weight percent being water.

Still another phenol-aldehyde resin system treating solution is made by diluting 100 parts of the resin of Resin C with 100 parts of water and adding thereto 20 parts of the modifier solution of modifier F. The product resin system comprises (on a 100 dry weight percent basis) about 20 weight percent phenol-formaldehyde resole resin; and 1.5 weight percent ammonium salt, and about 4.0 weight percent urea. The system has a pH of about 2.2 when in the form of an aqueous solution of about 35 weight percent total resin system solids. As thus made, this resin system, herein designated system G, contains about 25 weight percent total resin system solids with the balance up to 100 weight percent being water.

An adhesive system of the resorcinol-starch-formaldehyde type, herein designated adhesive J, is prepared as follows:

To 125 gallons of water is added 142 pounds of a commercially available resorcinol-starch mixture (from Penick and Ford under the trade designation Douglas Waterproof Corrugating Adhesive #7) and 150 pounds of corn starch. The resulting mixture is heated to form about 140 to 145° F. for 10 minutes at which time there is added thereto an additional 10 gallons of water and 20 pounds of caustic (sodium hydroxide). This last mixture is agitated for an additional 10 minutes thereafter at an elevated temperature of about 140° F. Finally, to the resulting mixture is added an additional 80 gallons of water. The product constitutes what can be termed the primary mixture, or carrier portion, of the adhesive system.

Next, is prepared the secondary mixture or raw starch portion, as follows: To 250 gallons water is added 1000 pounds of corn starch and 68 pounds of 37 percent aqueous formaldehyde. The composition is mixed at room temperature.

Finally, the primary mixture and the secondary mixture are admixed together and stirred for about 1 hour. The product is an adhesive system ready for use. This adhesive system has a total resorcinol to total starch weight ratio (based on total adhesive system solids) of from about 1 to 7, and it contains about 1.0 weight percent (based on total adhesive system solids) of combined formaldehyde, as well as about 70 weight percent (based on total adhesive system solids) of starch. It has a total adhesive solids content of about 25 weight percent, a viscosity of about 1000 centipoises and a gel point of about 150° F. determined by heating the adhesive in a water bath heated gradually to the gel temperature.

An adhesive system of the phenol-formaldehyde-starch type, herein designated adhesive K is prepared as follows:

To 16 weight parts of water is added 5 parts of the phenol-formaldehyde resin prepared in Example C, 2.1 parts of a 23 percent caustic (sodium hydroxide) solution, and 4.4 parts of corn starch. The resulting mixture is heated to 155–165° F. with continuous mixing and mixed an additional 10–20 minutes at 155–165° F. Finally, 13 parts of cooling water is added to the mixture. This product constitutes what can be termed the primary mixture, or carrier portion, of the adhesive system.

Next is prepared the secondary mixture or raw starch portion, as follows: To 41 parts water is added 18 parts corn starch. The composition is mixed at room temperature.

Finally, the primary mixture and the secondary mixture are admixed together and stirred for about one hour. The product is an adhesive system ready for use. The adhesive system has a total phenolic resin to total starch weight ratio (based on total adhesive system solids) of from about 1 to 8.6. It has a total adhesive solids content of about 25 percent, a viscosity of about 800 cps., and a gel point of about 148° F. as determined by heating the adhesive in a water bath heated gradually to the gel temperature.

Still another adhesive system, this one of the urea-starch-formaldehyde type, herein designated adhesive L, is prepared as follows:

234 pounds of carrier starch are heated at 180° F. in 84 gallons of water, cooled to 140° F. and 126 gallons of water added. 468 pounds of raw corn starch are then added and mixed to form a uniform dispersion. The pH is adjusted to 7–8 with sodium carbonate. When the temperature drops to about 90° F., 160 pounds of a water soluble urea-formaldehyde resin, having a solids content of 65 percent, is added and mixed. Immediately prior to use, the pH is adjusted to about 5.5 with an acid salt, e.g., ammonium chloride.

The product adhesive has a total solids content of about 32 weight percent (starch plus urea-formaldehyde resin) and it contains about 15 percent urea-formaldehyde resin solids on total starch.

Example B

A suitable starting corrugated fiberboard for use in the practice of the present invention is prepared using the materials of Example A, as follows:

Examples I-L

Using the procedure of Example B, and employing resin/silyl treating compositions of Example H and adhesives of Example A, suitable starting corrugated fiberboards for use in the practice of the present invention are prepared. Details appear in Table D below.

TABLE B.—STARTING CORRUGATED FIBERBOARD

| | Medium | | Liner | | Treating resin system | | | | Process board conditions | | | | |
|---|---|---|---|---|---|---|---|---|---|---|---|---|---|
| | | | | | | | | Amount in liner (percent) | | Amount adhesive applied | | Heat | |
| Ex. No. | Thickness (inch) | Grade wt., lbs./10³ sq. ft. | Thickness (inch) | Grade wt., lbs./10³ sq. ft. | System designation | Amt. in medium, percent resin | Percent volatiles | Resin | Volatiles | Type flutes | Lbs./10³ sq. ft. | Type | Temp. (° F.) | Temp. (sec.) |
| B | .009 | 26 | .009 | 42 | G | 8 | 6 | 4 | 6 | B | 4 | J | 350 | 2 |
| C | .009 | 33 | .018 | 69 | G | 10 | 5-8 | 5 | 5-8 | C | 4 | J | 350 | 2 |
| D | .009 | 26 | .009 | 42 | G | 8 | 6 | 4 | 6 | B | 4 | K | 350 | 2 |
| E | .009 | 26 | .009 | 42 | G | 8 | 6 | 4 | 6 | B | 4 | L | 350 | 2 |
| F | .009 | 25 | .005 | 61 | H | 12 | 8 | 3 | 5 | B | 4 | J | 340 | 3 |
| G | .009 | 33 | .015 | 62 | I | 10 | 6 | 7 | 8 | B | 4 | J | 340 | 3 |

Each side of a 26 pound basis weight medium paper sheet about 0.09 inch thick are roller coated and dried with modified phenolaldehyde resin system of system G to a total resin content of about 8 weight percent based on the dry weight of the sheet plus resin. One side of a 42 pound basis weight kraft liner paper sheet about 0.009 inch thick is roller coated and dried with the same resin system to a total resins content of 4 percent based on the dry weight of the sheet plus resin. The so-treated medium sheet and liner sheet are each dried to a total volatiles content of about 6 percent (as indicated by drying the paper to 160° C. for 10 minutes to determine weight loss).

Next, a medium sheet is corrugated into Type B flutes of about 50 per foot, and the resorcinol-formaldehyde-starch adhesive of adhesive J is applied to the tips of the flutes of the medium corrugations at the rate of about 4 pounds per 1000 ft.² of product fiberboard. The medium is then combined with two pieces of such liner sheet, one on each side of the adhesive treated medium sheet so as to form a corrugated fiberboard. This board is now exposed to a temperature of about 350° F. for about 2 seconds to dry and thermoset the adhesive. The product is an example of a starting corrugated fiberboard for use in this invention, Table B below summarizes.

Examples C-G

Using the procedure of Example B, but employing different medium and liner members, another suitable starting corrugated fiberboard is prepared as summarized in Table B below.

Similarly, other corrugated fiberboards are prepared as summarized in Table B below.

Example H

Paper treating compoistions containing organo silyl compounds as characterized hereinabove are prepared as follows:

To resin systems G, H, and I, respectively (see Example A) are added solutions of various silyl compounds with mixing until homogeneous fluid compositions result. Specifics are provided by Table C below.

TABLE C.—RESIN/SILYL TREATING COMPOSITIONS

| Resin/silyl treating composition designation | Resin system used | SILYL COMPOUND | |
|---|---|---|---|
| | | Type | Amount [1] |
| M | G | Glycidoxypropyl-trimethoxy silane. | 1 |
| N | H | γ-Aminopropyl-triethoxy silane. | 2 |
| O | I | n-(Dimethoxy methyl silyl isobutyl) ethylene diamine. | 2 |

[1] In parts by weight added to each 100 parts by weight resin system.

TABLE D.—STARTING CORRUGATED FIBERBOARD

| | Medium | | Liner | | Treating resin system | | | | Process board conditions | | | | |
|---|---|---|---|---|---|---|---|---|---|---|---|---|---|
| | | | | | | | | Amount in liner (percent) | | Amount adhesive applied | | Heat | |
| Ex. No. | Thickness (inch) | Grade wt., lbs./10³ sq. ft. | Thickness (inch) | Grade wt., lbs./10³ sq. ft. | System designation | Amt. in medium, percent resin | Percent volatiles | Resin | Volatiles | Type flutes | Lbs./10³ sq. ft. | Type | Temp. (° F.) | Temp. (sec.) |
| I | .009 | 26 | .009 | 42 | M | 8 | 5 | 4 | 7 | B | 4 | J | 340 | 2 |
| J | .009 | 26 | .009 | 42 | N | 9 | 5 | 5 | 6 | C | 4 | K | 340 | 3 |
| K | .009 | 33 | .015 | 62 | O | 10 | 6 | 4 | 5 | B | 4 | J | 350 | 2 |
| L | .009 | 33 | .015 | 62 | | | | | | | | | | |

Example 1

A sample of the corrugated fiberboard of Example B is scored, then thermoset by heating for 4 min. at 390° F., and the product is tested for crack resistance by folding along the score line about 90° and notice the condition of the outside liner.

This product, when compared to another sample of the same fiberboard which is first thermoset under identical conditions and then identically scored, is found to have very much better crack resistance along and in lines of score when each sample is bent and flexed for 90° along the score line therein. The product is also found to have excellent rigid-when-wet properties, including moisture resistance and wet strength.

Example 2

A sample of the corrugated fiberboard of Example B is formed into box blanks in a machine operation involving cutting, scoring, slotting, and taping, after which the resulting blanks are subjected to a temperature of about 400° F. for about 2 minutes in order to substantially completely thermoset the resin.

Containers are assembled from blanks made as above described and containers are made from blanks made as above but without any resin treatment of the starting corrugated fiberboard. The containers are compression tested for strength (top to bottom) ASTM Test Procedure D-642-47. The conditions and results are listed in Table I.

TABLE I

| Condition | Container strength, pounds | |
|---|---|---|
| | Untreated | Treated |
| (a) 50% relative humidity/24 hrs. at 72° F | 645 | 817 |
| (b) 95% relative humidity/24 hrs. at 72° F | 213 | 624 |
| (c) In water for 24 hours | 10 | 275 |

In addition, the resin-treated containers display excellent crack resistance along lines of score compared to non-resin treated containers.

Examples 3–7

Respective samples of each of the corrugated fiberboards of Examples C, D, E, F and G are scored and thermoset as described in Example 1. In each instance, the product has much better crack resistance along and in lines of score than is associated with comparable corrugated fiberboard containing no resin treated medium and/or liner members.

Example 8

A sample of the corrugated fiberboard of Example I is scored, thermoset and tested in accordance with the procedures of Example 1. The product, compared to untreated, comparably evaluated material, is found to have very much better crack resistance along and in lines of score when bent and fixed. The product is also found to have excellent rigid-when-wet properties.

Example 9

A sample of the corrugated fiberboard of Example 1 is formed into box blanks then containers, and, finally, are tested by the procedures described in Example 2.

The product containers display excellent rigid-when-wet properties and excellent crack resistance along lines of score compared to non-resin/silyl composition treated containers.

In general, the present invention is particularly advantageous when relatively large quantities of the modified phenol-aldehyde resin system and (when used) if the organosilyl compound are used in treating since under such circumstances a product corrugated fiberboard tends to have a greater likelihood of poor crack resistance. Use of an organosilyl compound with the modified phenol-aldehyde resin system in treated medium and/or liner members improves moisture/water resistance of product corrugated fiberboard as measured by flat crush or (more preferably) by top/bottom compression comparative tests.

What is claimed is:
1. A process for making a scored corrugated fibreboard construction which is adapted to have crack resistance in score lines regions and to have wet strength, said process comprising in combination the steps of:
   (A) bonding together with an adhesive a liner member and a corrugated medium member so as to form a corrugated fiberboard.
   (1) said adhesive being interposed between said liner member and said corrugated medium member at positions where flute tips of said corrugated medium member contact said liner member,
   (2) said adhesive being initially in a fluid condition and adapted when in the form of a film of about 10 mils thickness to be dried to a substantially water insoluble state under temperatures of from about 225 to 350° F. applied, inversely, for times of from about 5 to 0.5 seconds,
   (3) said corrugated medium member being a cellulosic paper having a thickness of from about 7 to 15 thousandths of an inch and a grade weight of from about 25 to 36 pounds per 1000 sq. ft.,
   (4) said liner member being a cellulosic paper having a thickness of from about 5 to 20 thousandths of an inch and having a grade weight of from about 33 to 120 pounds per 1000 sq. ft.,
   (5) said medium, or said liner, or both said medium and said liner, each having been treated with from about 5 to 20 weight percent (dry weight basis) with a substantially B-staged modified phenol-aldehyde resin system and having a total volatiles content of from about 5 to 10 weight percent,
   (6) said modified phenol-aldehyde resin system having a pH in the range of from about 0.8 to 6 when in the form of an aqueous solution of about 35 weight percent total resin system solids and comprising:
      (a) from about 80 to 94 weight percent (based on total modified phenol-aldehyde resin system dry weight basis) of a phenol-formaldehyde resole,
      (b) from about 1 to 5 weight percent (same basis) of at least one inorganic ammonium salt having a pH of from about 0.8 to 6.5 when in a 5 weight percent aqueous solution, and
      (c) the remainder up to 100 weight percent (same basis) of any given such system being urea,
   (7) said phenol-formaldehyde resole being further characterized by having:
      (a) a water solubility such that a 55 weight percent aqueous solution thereof can be prepared,
      (b) a formaldehyde to phenol combined mol ratio of from about 0.9 to 3.0,
      (c) a pH of from about 7 to 9.2 when in the form of an aqueous solution of about 35 weight percent total resin solids, and
      (d) an ash content of less than about 2.5 weight percent (based on a 35 weight percent solution of total resin solids),
   said bonding being conducted at temperatures of from about 225 to 350° F. within times of from about 0.5 to 5 seconds,
   (B) scoring the resulting so-formed corrugated fiberboard, and
   (C) heating the resulting so-scored corrugated fiberboard to temperatures of from about 320° F. to 450° F. for, inversely, times of from about 0.5 second to to 10 minutes whereby said modified phenol-aldehyde resin system is substantially completely thermoset.

2. The process of claim 1 wherein said adhesive is resorcinol-starch-formaldehyde.

3. The process of claim 1 wherein said adhesive is phenol-formaldehyde-starch.

4. The process of claim 1 wherein said adhesive is urea-starch-formaldehyde.

5. The process of claim 1 wherein said phenol-formaldehyde resole has a formaldehyde to phenol combined mol ratio of from about 1.4 to 2.5.

6. The process of claim 1 wherein said modified phenol-aldehyde resin system has a pH of from about 1 to 4 when in the form of an aqueous solution of about 35 weight percent total resin system solids.

7. The process of claim 1 wherein said modified phenol-aldehyde resin system contains ammonium chloride.

8. The process of claim 1 wherein said inorganic ammonium salt comprises ammonium chloride.

9. The process of claim 1 wherein said medium or said liner, or both, have been treated with from about 5 to 20 weight percent dry weight basis of a composition comprising said modified phenol-aldehyde resin system and an organosilyl compound wherein the weight ratio of said resin system to said silyl compound ranges from about 6.0 to 99.5, said organosilyl compound being characterized by:
(1) containing at least one silicon atom per molecule,
(2) having a molecular weight from about 60 to 500,
(3) being water dispersible,
(4) being polymerizable with itself, and
(5) being thermosettable when uniformly heated to temperatures ranging from about 250 to 450° F. to such an extent that the resulting thermoset polymer gives less than 2 weight percent total extractables with acetone.

References Cited

UNITED STATES PATENTS

| | | | |
|---|---|---|---|
| 3,616,163 | 10/1971 | Reisman | 161—133 |
| 3,603,219 | 9/1971 | Hallis, Jr. | 93—58 ST |
| 3,151,996 | 10/1964 | Desmarais | 106—213 |
| 3,431,162 | 3/1969 | Morris | 156—210 |
| 2,325,302 | 7/1943 | Britt | 117—155 L |
| 2,758,946 | 8/1956 | Spalding et al. | 117—135.5 |
| 2,350,336 | 6/1944 | Bauer et al. | 264—286 |
| 2,862,542 | 12/1958 | Norton | 264—286 |

ALFRED L. LEAVITT, Primary Examiner

D. G. GLANTZ, Assistant Examiner

U.S. Cl. X.R.

117—55 L; 156—205, 207, 211